F. M. WALTS.
OPTICAL REFLECTOR.
APPLICATION FILED MAR. 16, 1910.

1,074,145.

Patented Sept. 30, 1913.

Witnesses:
Wm. Ashley Kelly
Victor D. Borst

Inventor
Frank M. Walts
By his Attorney
Henry D. Williams

F. M. WALTS.
OPTICAL REFLECTOR.
APPLICATION FILED MAR. 16, 1910.

1,074,145.

Patented Sept. 30, 1913.

Witnesses:
Wm. Ashley Kelly
Victor D. Borst

Inventor
Frank M. Walts
By his Attorney
Henry D. Williams

F. M. WALTS.
OPTICAL REFLECTOR.
APPLICATION FILED MAR. 16, 1910.

1,074,145.

Patented Sept. 30, 1913.

Witnesses:

Inventor
Frank M. Walts
By his Attorney
Henry D. Williams

UNITED STATES PATENT OFFICE.

FRANK M. WALTS, OF NEW YORK, N. Y.

OPTICAL REFLECTOR.

1,074,145.   Specification of Letters Patent.   Patented Sept. 30, 1913.

Application filed March 16, 1910. Serial No. 549,591.

*To all whom it may concern:*

Be it known that I, FRANK M. WALTS, a citizen of the United States, residing at the borough of Manhattan, city of New York, in the county of New York and State of New York, have invented certain new and useful Improvements in Optical Reflectors, of which the following is a specification, reference being had therein to the accompanying drawings, forming part thereof.

My invention relates to eyeglasses embodying reflectors for viewing objects which are out of the direct line of vision, and one of the objects of my invention is the better viewing of such objects, particularly at the side, without the necessity of shifting the eyes away from natural position.

Another of the objects of my invention is the viewing of objects substantially in any direction, as determined by the position and angle of the reflector, without appearing to look in the direction of the object viewed.

Another and very important object of my invention is to render the reflector and its support inconspicuous.

Another object of my invention is to enable the employment of a reflector for each eye without one of the reflectors interfering with the use of the other.

Another object of my invention is to obtain a large field of vision in the reflector.

Other more particular objects of my invention will hereinafter appear.

My invention includes means for supporting the reflector at the rear of the glass in such a way that it will be practically concealed by the glass and its usual fittings.

In the preferred embodiment of my invention, the reflector is normally located at the rear side of the glass in proximity to the frame or clip at the inner edge of the glass, but for certain purposes the reflector is bodily adjustable across the rear face of the glass away from its normal position.

My invention also includes means by which the angle of the reflector is automatically varied concurrently with its bodily adjustment, so that the object viewed will be presented to the eye in the same advantageous relation as before.

My invention in the best or most desirable form in which it has been embodied includes a series of jointed or pivoted levers or arms adjustably supporting the reflector on the eyeglass frame at the inner edge of the glass.

My invention also includes a pair of reflectors located and supported in such a manner that, while one of the reflectors is in use, the other reflector will not be in the line of vision of the other eye.

My invention also includes various combinations of parts and several details of construction, as will appear from the following particular description of the several embodiments thereof illustrated in the accompanying drawings, which I shall now describe and shall thereafter point out my invention in claims.

Figure 1:
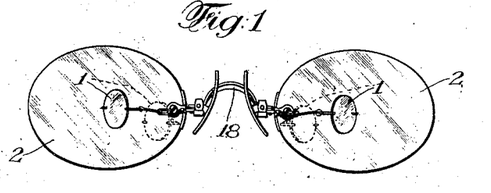
Figure 1 is a rear elevation of a pair of eyeglasses equipped with one embodiment of my invention.
Figure 2:
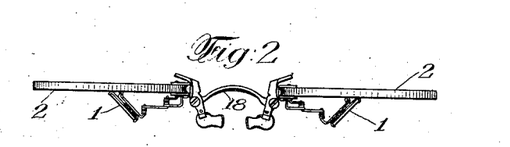
Fig. 2 is a top view of what is shown in Fig. 1.
Figures 3, 6:
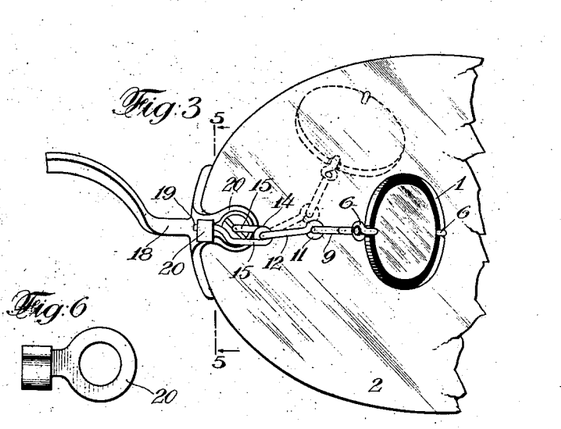
Fig. 3 is an enlarged rear elevation, with parts omitted and portions broken away, of what appears at the right of Fig. 1.
Fig. 6 is a detail side elevation of a spring catch forming a part of the reflector support, drawn to the same scale as Fig. 5.
Figure 4:
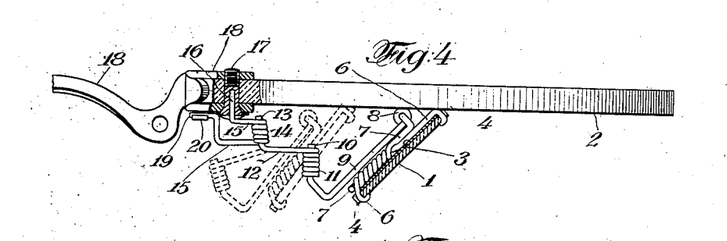
Fig. 4 is a top view, partly in central horizontal section, of what is shown in Fig. 3.
Figure 5:
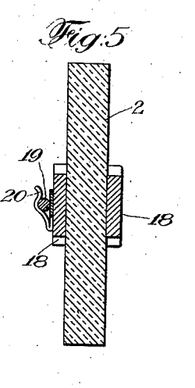
Fig. 5 is a vertical section on a further enlarged scale on the line 5—5 of Fig. 3 as viewed from the right.
Figure 20:
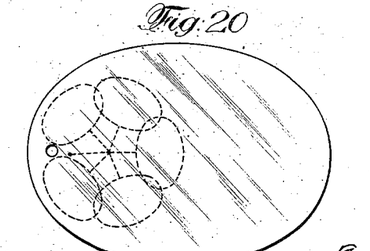
Fig. 20 is an enlarged rear view of a spectacle glass having indicated thereon in dotted lines some of the positions of adjustment possible for the reflector in the construction illustrated in Figs. 1 to 6, inclusive.

In the embodiment of the invention illustrated in Figs. 1 to 6, inclusive, of the drawings, circular mirrors 1 are arranged at the rear sides of the glasses 2 of an ordinary pair of eyeglasses, as shown. The mirrors 1 are adjustably supported, and in Figs. 1, 2, 3 and 4 are shown as adjusted to an extended position near the center of the glasses 2 so as to better illustrate the supporting means, and although they would usually, by reason of the better concealment afforded, be employed in the retracted position indicated in dotted lines in Figs. 1 and 4, they may be adjusted to substantially any position within the locations indicated by dotted lines in Fig. 20. The reflector 1 is intended primarily for viewing objects at the side and substantially at right angles to the ordinary direct line of vision, and the reflector 1 is so mounted as to automatically change its angle to the glass 2 and consequently to the eye as its bodily position is shifted from extended to retracted position, or vice versa, as indicated in dotted lines in Fig. 4, so as to still present the same objects or the same field of vision to the eye as before without any alteration in position of the head of the wearer of the glasses, and avoiding obstruction of the reflected view by reason of the restricted field between the glass 2 and the face of the wearer. The reflectors 1 are most inconspicuous when adjusted to the retracted position indicated in dotted lines in Figs. 1 and 4, but in certain cases, when inconspicuousness or concealment is not a prime object, the reflectors may, for greater convenience in use and when it is not desired to look past the reflector directly through the glasses 2, be adjusted to the extended position shown in full lines in Figs. 1, 2, 3 and 4, being then substantially in the direct line of vision. The other positions of adjustment, such, for example, as are indicated in Fig. 20 and in dotted lines in Fig. 3, are employed when it is desired to look upward to a point above the glasses or downward to a point below the glasses or to some intermediate point. It is preferable that the reflectors 1 and their immediate adjuncts should be readily detachable from the eyeglasses, leaving substantially no indication that such reflectors have been attached thereto.

Figure 19:
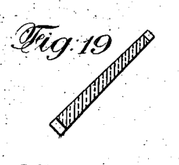
Fig. 19 is an enlarged transverse section of a reflector glass, in which the thickness and taper are exaggerated or accentuated for clearness of illustration.

The reflector 1 is a mirror composed of thin silvered glass and for the purpose of causing a single image to be presented to the eye by the light rays reflected from the two surfaces of the glass, the mirror may be a weak prism, as is more clearly shown in Fig. 19; or, if the glass is extremely thin, one thirty-second of an inch or less, then the faces should be parallel. I find it convenient to select pieces of glass having the proper reflective action to effect this result, or preferably optical glass may be accurately ground for the purpose. It should be noted, because of the more direct or more acute angle of incidence of the light rays, that the location of the reflector inward rather than outward from the eye diminishes the objectionable double reflection to be provided for as above noted. Also it is to be noted that the location of the reflector away from the outer edge of the eyeglass and nearer to the inner edge thereof has the highly important effect of giving a larger field of vision for a reflector of a given size, because of the more advantageous angle at which the reflector is employed. It is understood, however, that it is within the scope of the present invention to employ any kind of reflector, such as a normal, magnifying or diminishing reflector, a metallic reflector, a rectifying prism or a plurality of reflectors which may effect rectification of the image; also, if desired, lenses may be employed in conjunction with the reflectors to give a telescopic effect and arranged for adjustment to individual sight. However, the simple form of reflector illustrated in the drawings it is believed will answer most practical requirements and gives an inexpensive and simple construction, conveniently used and readily adjusted.

Figure 17:
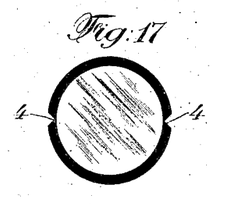
Fig. 17 is a detail face view of the reflector employed in the constructions illustrated in Figs. 1 to 10, inclusive.

To prevent the throwing into the eye of bright rays which would interfere with distinct vision, such as might result from reflection at the edges of the reflector, the silvering around the margin is removed and a blackened border at the back substituted, as indicated in Figs. 3 and 17. To harmonize the appearance of the back of the reflector with that of the frame of the glasses and to render it in other respects less conspicuous, a gold plate or disk 3, having a dull or Roman finish, is secured to the back of the reflector. Opposite notches 4 are provided in the edges of the reflector for the reception of holding or supporting means and to permit the edge of the reflector to come in close proximity to the eyeglass 2 without interference of the supporting means.

The means shown for adjustably supporting the reflector 1 on the glass 2 will now be described. The supporting means illustrated in the drawings are shown as formed for the most part of wire, this material having been found well adapted for the purpose, being inexpensive, easily worked and providing a simple and strong construction. A holder or clip 6 of wire has bent or hooked ends engaging in the notches 4 at the edges of the reflector 1, and at the back of the reflector the holder has a straight portion lying in contact with the back of the disk 3, the disk 3 protecting the backing of the glass 2 from abrasion, and the holder 6 has another portion intertwisted with a wire standard 7, the intertwisted portions also lying in contact with the back of the disk 3. The standard 7 has a straight portion extending alongside of the straight portion of the holder 6, this straight portion of the standard 7 being bent outwardly to form a portion extending away from the back of the reflector and then bent again at its end to form a pivot pin substantially parallel with the back of the reflector and lying transverse to and substantially at right angles to the holder 6. The pivotal end of the standard 7 is pivoted in a coil 8 formed on the adjacent end of a supporting arm 9. In the position of adjustment shown in full lines in the drawings, the reflector 1 is shown as located just inwardly from the center of the glass 2 substantially in the direct line of vision and is disposed at an angle of substantially 45° to the glass 2 and to the eye, and, hence, would present to the eye objects substantially directly at the side of the observer. For the purpose of at all times maintaining this angular position of the reflector when desired, and also for the purpose, when desired, of varying from this angular position so as to present to the eye objects more at the rear or more in front, even to the extent of reflecting beams of light transmitted through the glass 2, as with the reflector in the position indicated in dotted lines in the modified construction shown in Fig. 14, the joint formed by the pivotal end of the standard 7 and the coil 8 is sufficiently rigid or stiff so that it will at all times retain its position of adjustment, excepting when intentionally compelled to move and will not be disturbed by the manipulation necessary to effect other adjustments. For viewing objects through the glass 2, and reflected from the reflector 1, to the best advantage, the reflector 1 should be adjusted to a position substantially at right angles to the glass 2 near to the inner edge of the glass 2 and preferably the reflector should be tilted upwardly, by reason of the usually downwardly inclined position of the head of the wearer.

The supporting arm 9 extends from the coil 8 substantially parallel to the back of the reflector 1 and substantially parallel to the holding clip 6, and is turned at its other end to form a pivot pin 10, which enters a coil 11 formed at the adjacent end of an intermediate swinging arm 12, the axis of the joint or pivot formed by the pivot pin 10 and the coil 11 being disposed substantially at right angles to the glass 2. The intermediate arm 12 extends inwardly from the coil 11 substantially parallel with the glass 2 and has an inner end portion 13 bent toward the glass 2 at a slightly obtuse angle to the median portion of the arm and entering a coil 14 formed at a median portion of a wire-supporting base 15. The axes of the pivots formed at the respective coils 11 and 14 are disposed at a slight angle to one another substantially in the same plane. The result of this inclination of the axes of the pivots at the opposite ends of the swinging intermediate arm 12 is to automatically adjust the angle of the reflector 1 when the reflector is bodily adjusted from extended to retracted position, or vice versa, as shown in full and indicated in dotted lines in Fig. 4. By reason of this angular adjustment automatically taking place concurrently with the bodily adjustment, the same object will be presented to the eye regardless of the adjusted position of the reflector 1 and avoiding annoying reflections from the back of the glass 2, and also obviating any obstruction of the vision by the glass 2 or by the head of the wearer. The normal position of the reflector 1 is the retracted position indicated in dotted lines in Figs. 1 and 4, as the reflector is then most inconspicuous, but, as shown in the drawings and hereinbefore noted, the reflector may, within certain limits, be adjusted away from its normal position.

The base 15 is secured to the frame of the eyeglasses at the inner edge of the glass 2, and is detachably fixed in position to permit its ready removal together with all of the parts carried thereby, including the reflector 1. The support 15 has substantially parallel portions or branches extending from respective ends of the coil 14, the branch nearest to the glass 2 having its end portion 16 bent substantially at a right angle and inserted into a longitudinal hole provided axially in a screw 17 forming a part of the frame 18 and securing the frame 18 to the glass 2. The other branch of the base 15 is provided, as shown most clearly in Fig. 4, with two substantially right angular bends to provide a foot 19 adapted to be received beneath a spring catch 20 of sheet metal held in place by the head of the screw 17. The reflector 1 and all its adjuncts, excepting alone the catch 20, are readily removable merely by slipping the foot 19 from beneath the spring catch 20 and then withdrawing the end 16 from the longitudinal hole in the screw 17. This enables the eyeglasses to be used without the reflectors 1 and without any readily observable traces thereof, when desired. To attach the reflectors, the end 16 of the base 15 is inserted into the hole in the screw 17 and the foot 19 is then slipped beneath the spring catch 20. The joints at the coils 11 and 14 are made sufficiently tight to retain any position of adjustment in which the arms 9 and 12 may be placed. Also the ends 10 and 13 of these respective arms are bent or otherwise upset sufficiently to securely retain them in the coils 11 and 14, respectively, the standard 7 at its pivotal end being in like manner retained in the coil 8 of the arm 9. It is to be noted that, in adjusting the reflector 1, adjusting movement may take place either at the coil 11 or at the coil 14 or at both these points, thereby permitting a large scope of adjustment of the reflector 1 both rotatively and bodily.

Both of the reflectors 1 should not be at the same time directly in front of the eyes, and, even in their most extended positions of adjustment shown in full lines in Figs. 1, 2, 3 and 4, would for most eyes be located inwardly from the direct line of vision, and by reason of this feature of construction a very important advantage is secured. By reason of that physiological relation or manner of muscular control of the eyes which causes them always to move automatically in relative parallelism, when one eye is directed toward one of the reflectors, the other eye will then be directed away from and to a point beyond the outer edge of the other reflector, thereby enabling either one of the reflectors to be used to view an object without the presentation to the other eye of other objects at the other side of the observer. This desirable effect is most pronounced when the two reflectors 1 both occupy their normal positions near to the inner margin of the glass 2, shown in broken lines in Figs. 1 and 4, and is least pronounced, though to most eyes still present to a practical extent, when both reflectors are in their positions of maximum extension shown in full lines in Figs. 1, 2, 3 and 4. However, for best results, when it is desired to use one of the reflectors in fully extended position, the other reflector may be adjusted to a more or less retracted position, and either reflector may thus be used without regard to or disturbance from the other. The above described highly desirable effect is present whenever both reflectors 1 are located at any of the locations inward from the center of the glass, as indicated in Fig. 20, but it is preferable, for best results, as above noted, that at least one of the reflectors should not occupy its position of extreme extension shown in full lines in Figs. 1, 2, 3 and 4, and indicated in broken lines at the right in Fig. 20.

Figure 7:
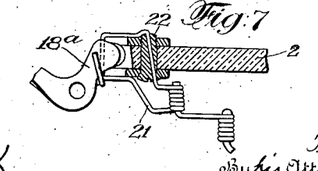
Fig. 7 is a view similar to Fig. 4, showing a slightly modified reflector support, the reflector being omitted.

The modified construction illustrated in Fig. 7 is substantially the same as that illustrated in Figs. 1 to 6, inclusive, excepting that a base 21 is provided which is not readily detachable. In this construction, the securing screw 22 has a longitudinal oblique hole from end to end thereof, through which passes one branch of the wire forming the base 21, this branch of the wire then being turned and wound part way around the base of the frame 18$^a$, engaging in such winding with the end of the other branch of the wire forming the base 21 in the manner clearly shown, thereby securely attaching the base 21 to the frame 18$^a$. The construction in other respects than noted above may be the same as that described in reference to Figs. 1 to 6, inclusive.

Figure 8:
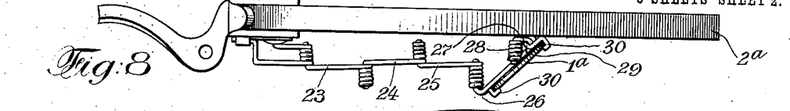
Fig. 8 is a top view of a modified construction.
Figure 9:
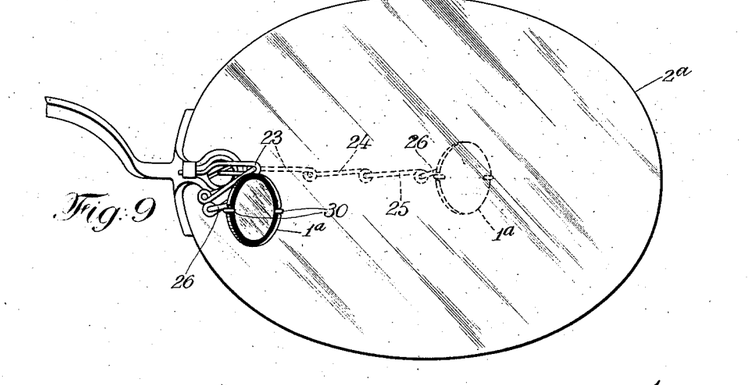
Fig. 9 is a rear elevation of what is shown in Fig. 8, but with the reflector shown in broken lines adjusted to the same position and shown in full lines adjusted to a different position.

The modified construction illustrated in Figs. 8 and 9 differs chiefly from that described in reference to Figs. 1 to 6, inclusive, in providing a series of three pivoted intermediate arms 23, 24 and 25 corresponding to the single intermediate arm 12, thereby giving a greater range of adjustment of the reflector 1$^a$. Also there is a further variation of construction in the mounting of the reflector 1$^a$ in that a supporting arm 26 for the reflector 1$^a$ is provided, which, while pivoted to the arm 25 in a manner substantially similar to that in which the arm 9 is pivoted to the arm 12 in the first described construction, at its other end is united by a universal joint to the reflector 1$^a$, such universal joint being made up of a short link 27 pivoted at one of its ends in a coil 28 formed at the adjacent end of the arm 26 and disposed substantially perpendicular to the glass 2$^a$. At its other end the link 27 is pivoted in a coil 29 disposed substantially at right angles to the coil 28 and formed upon and substantially at right angles to a wire clip or holder 30 engaging the reflector 1$^a$ substantially in the same manner as it is engaged by the clip or holder 6 in the first described construction. The pivot formed by the coil 29 with the link 27 performs a substantially similar function to that of the pivot formed by the coil 8 and standard 7, whereas the pivot formed by the coil 28 and link 27 is an additional pivot, the counterpart of which is not found in the first described construction. The reflector 1$^a$ may rotate about the pivot at the coil 28 as an axis without substantially partaking of bodily swinging movement or other bodily traveling movement. It is to be noted in this construction that the axes of alternate pivots of the four pivots of the connecting arms 23, 24 and 25 are arranged substantially parallel one to another while the axes of adjacent pivots are inclined to one another or disposed at an angle to one another, the axes of all of the pivots, however, in one of the positions of adjustment, lying substantially in a plane transverse to the glass 2ª, the axes of the joints on pivots formed at the outermost ends of the arms 23 and 25 being disposed substantially perpendicular to the lens glass 2ª, as is clearly evident in Fig. 8. This arrangement of alternately inclined pivots produces a similar result of automatically adjusting the angle of the reflector 1ª as is produced by the inclined pivots at opposite ends of the intermediate arm 12 in the construction described in reference to Figs. 1 to 6, inclusive. The extended position of the reflector 1ª is shown in Fig. 8 and the retracted or normal position thereof is shown in Fig. 9, dotted lines there indicating the extended position. Also Fig. 9 illustrates the manner in which the arms 23, 24 and 25 fold together alongside of one another so as to be substantially concealed by the frame of the glass, the reflector and its supporting means being rendered so inconspicuous as not to be readily observable to a third party when the glasses are worn. This construction shown in Figs. 8 and 9 is the most desirable and practicable form in which the invention has been worked out. This construction affords a maximum of adjustability within the most advantageous ranges and also, when desired, may be rendered quite inconspicuous by adjustment to a retracted position, such as shown in Fig. 9. In other respects than above noted, the construction shown in Figs. 8 and 9 is substantially the same as that shown in Figs. 1 to 6, inclusive.

The greater range of adjustment of the reflector 1ª in the construction illustrated in Figs. 8 and 9 over that of the reflector 1 in the construction illustrated in Figs. 1 to 6, inclusive, includes a position central of the glass 2ª in the direct line of vision, and in its most extended position the reflector 1ª will occupy a position slightly outward from the center of the glass 2ª, as shown in Fig. 8 and indicated by broken lines in Fig. 9. It would not be advisable, however, to have two reflectors 1ª, each adjusted to a position central of the glass and directly in front of the eye, because of the fact that, as hereinbefore explained, the presentation of objects to one eye by one reflector would be disturbed by the presentation of other objects to the other eye by the other reflector; but this difficulty is easily avoided by adjusting one of the reflectors away from the central position. The adjustment outward from the center will be efficacious, but an inward adjustment gives a more pronounced result and is in other respects usually far more desirable. Also the inward adjustment will give the largest possible field of vision of which the reflector is capable.

Figure 10:
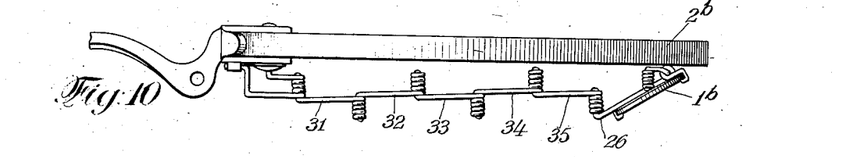
Fig. 10 is a top view of a construction slightly modified from what is shown in Fig. 8.

Fig. 10 presents substantially the same construction as that just described in reference to Figs. 8 and 9, differing therefrom only in the employment of a series of five intermediate arms 31, 32, 33, 34 and 35, instead of the three intermediate arms 23, 24 and 25. This construction affords a wider range of adjustment in that the reflector 1ᵇ may be adjusted to an extended position in proximity to the outer edge of the glass 2ᵇ as shown, while still admitting of the other adjustments hereinbefore described. In fact, in this construction the reflector may be bodily adjusted to any position within the boundaries of the glass 2ᵇ. However, it would seldom be necessary or desirable to employ a reflector at the extreme position of extension shown in Fig. 10. Also in this extended position the angle of the reflector is necessarily such that the reflector is disposed more nearly edgewise to the available field and likewise to the eye, causing a correspondingly smaller field of vision to be presented to the eye than in the more inward positions of the reflector shown in the preceding figures and of which the construction shown in Fig. 10 also admits, as hereinbefore noted. The most desirable field for the employment of the reflector, for convenient service without eye strain, for inconspicuousness for securing the most extended field of vision and for the most sharply defined image, is within the inner half of the glass, as indicated in Fig. 20, and capable of being covered by the construction shown in Figs. 1 to 6, inclusive, and also with somewhat greater facility by the construction shown in Figs. 8 and 9.

The construction illustrated at Fig. 10 is the most complete embodiment of the invention, although not necessarily the preferred construction. In many instances some of the simpler constructions might be preferable for particular purposes; and as hereinbefore mentioned, the construction illustrated at Figs. 8 and 9 would probably be that most generally used for a variety of purposes. However, because of the fact that the construction illustrated at Fig. 10 contains the greatest number of features, the claims herein are directed more particularly to this embodiment of the invention. It is to be understood that in constructions for special uses the features not desired may be omitted.

Figures 11, 12:
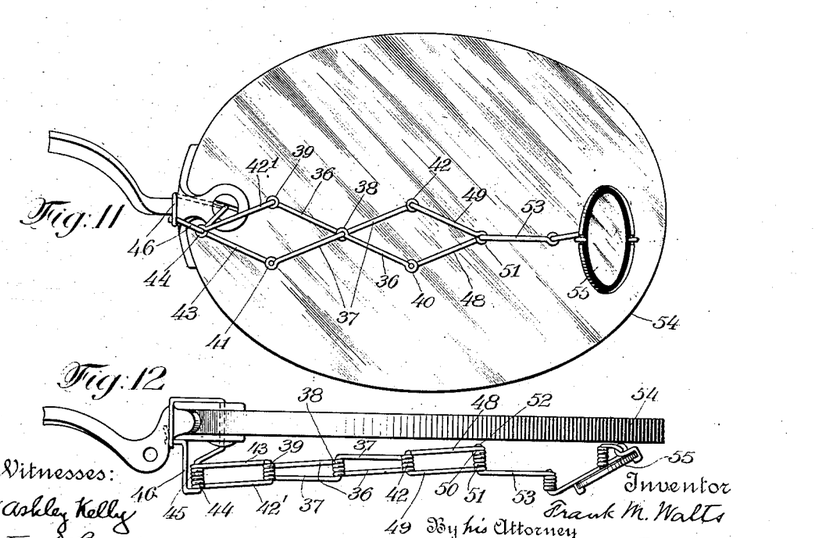
Fig. 11 is a rear elevation of another modified construction.
Fig. 12 is a top view of what is shown in Fig. 11.

In the modification illustrated in Figs. 11 and 12, the support for the reflector includes lazy tongs levers. This construction is substantially the same as that illustrated at Fig. 10, excepting that the lazy tongs levers are substituted for the first four of the arms 31, 32, 33 and 34 in the series of five pivoted arms. The lazy tongs comprise two crossed long arms or levers 36 and 37 pivoted together at their median point, the arm 36 being provided with a coil 38 through which passes a right-angularly bent median portion on the other arm 37. The arm 36 is provided at its inner end with a coil 39 and at its outer end with a coil 40, and the arm 37 is correspondingly provided with end coils 41 and 42. The coils 39 and 41 of the arms 36 and 37, respectively, are pivotally engaged by the right-angularly bent end portions of inner short arms 42' and 43, respectively. The short arms 42' and 43 are provided at their inner ends, respectively, with coils 44 and 45, both of which pivotally encircle an upstanding portion of a base support 46, shown as secured to the frame 47 in substantially the same manner that the base 21 shown in Fig. 7 is secured. The coils 40 and 42 at the outer ends of the crossed arms 36 and 37, respectively, are pivotally engaged by the right-angularly bent ends of outer short arms 48 and 49 respectively. The outer short arms 48 and 49 are provided at their outer ends, respectively, with the coils 50 and 51, which are both pivotally engaged by the bent pivotal end 52 of a swinging arm 53 corresponding substantially in relative location and function to the swinging arms 12 (Figs. 1, 2, 3 and 4), 25 (Figs. 8 and 9), and 35 (Fig. 10). The lazy tongs arrangement affords the advantage over a long series of jointed arms in that it is more readily and conveniently manipulated to obtain the various adjustments and, on the other hand, it presents the disadvantage of being somewhat more conspicuous. Because of this fact of greater conspicuousness, it is preferable to employ the lazy tongs arrangement upon a dark glass 54, as indicated by the darker shading in the drawings.

The range of adjustment of the lazy tongs arrangement is substantially the same as that of the construction shown in Fig. 10 and, as in that construction, the reflector 55 may be adjusted to an extreme position in proximity to the outer edge of the glass 54, and for better illustration of the supporting means is shown in the drawings as adjusted to this extreme outer position. It is to be noted that the reflector 55 may be folded or retracted substantially to the inner position shown at Fig. 9. The dark glass 54 presents an advantage over the light or ordinary clear glass shown in Figs. 1 to 10, inclusive, in that it provides a dark background for the image seen in the reflector 55. The reflector 55 is oval, such as is more clearly shown at Fig. 18, instead of circular, as in the hereinbefore described constructions. An oval reflector gives a larger field of vision and may be advantageously employed particularly upon dark glasses. The use of a circular or of an oval reflector is largely a matter of taste. However, an oval reflector is more desirable in that a reflector of larger area may be employed, because of the fact that the width of the reflector is necessarily limited by reason of the limited space, while its length may be extended as found desirable. The width being the same, a circular reflector is to some extent preferable upon light or clear glasses, because less conspicuous.

Figures 13, 14, 18:
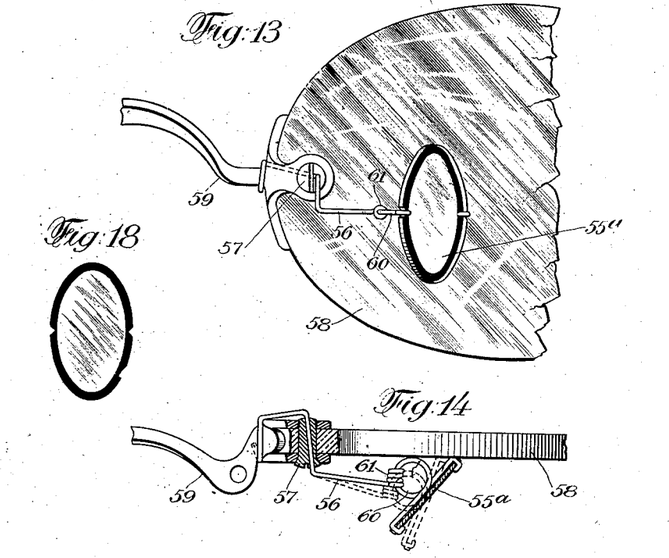
Fig. 13 is a rear elevation of a simplified modification.
Fig. 14 is a top view, partly in section, of the construction shown in Fig. 13.
Fig. 18 is a similar view of the reflector employed in the constructions illustrated in Figs. 11 to 15, inclusive.

The modification illustrated in Figs. 13 and 14 is a somewhat simpler embodiment of the invention than has heretofore been described. A wire supporting standard 56 passes longitudinally through a screw 57 from the rear to the front of the glass 58 and this front portion of the wire of the support 56 is extended and tied securely about the post of the frame 59, as clearly shown in the drawings, and an oval reflector 55$^a$ is employed substantially the same as the reflector 55 (Figs. 11 and 12) and shown in face view at Fig. 18. The reflector 55$^a$ is held by a holder or clip provided at the back of the reflector with a circular turn forming a ring 60. The ring 60 passes through and forms a pivotal connection with a coil 61 formed at the end of the support 56, which at the rear of the glass 58 extends downwardly and outwardly from the screw 57 of the frame 59 adjacent to the inner edge of the glass 58. The reflector 55$^a$ is shown as located inward and somewhat downward from the center of the glass 58, this position being convenient for the eye, the reflector and its support being concealed by the darkness of the dark glass 58. The ring 60 and coil 61 are combined so as to form a universal joint permitting the reflector 55$^a$ to be rotatively adjusted about the axis of the coil 61, which is substantially perpendicular to the glass 58, and also permitting the angular adjustment of the reflector as indicated in dotted lines in Fig. 14, by reason of the slipping of the ring 60 through the coil 61, the support 56 then yielding slightly away from its original position, as also indicated in Fig. 14, by reason of the contact of the edge of the reflector 55$^a$ with the rear surface of the glass 58. In the position of the reflector shown in full lines in Figs. 13 and 14, objects directly at the side of the observer will be presented to the eye by the reflector. In the position of the reflector indicated by dotted lines in Fig. 14, objects more at the front would be observed by light passing through the glass 58 and then reflected to the eye from the reflector 55$^a$.

Figure 15:
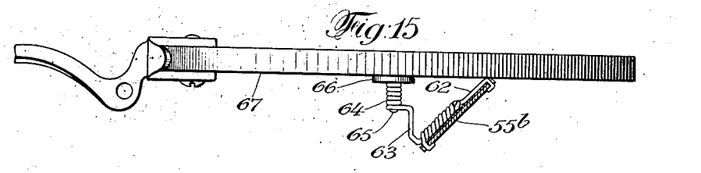
Fig. 15 is a top view of a further simplified modification.

Fig. 15 illustrates a yet simpler modification of the invention. In this construction a reflector 55$^b$ is carried by a holding clip 62 intertwisted for a portion of its length with a short, bent, swinging arm 63, provided at its inner end with a coil 64 pivoted upon a wire stud 65, which in turn is fixed at one end in a small disk 66 of glass, celluloid, or other transparent or translucent material, so as to be inconspicuous from the front of the dark glass 67. The disk 66 is secured to the glass 67 by an adhesive and may be located at any point desired on the rear face thereof, being shown in Fig. 15 as located substantially at the center of the glass 67. The reflector 55ᵇ may be freely rotatively adjusted about the stud 65, but cannot be moved bodily without rotation to different locations upon the rear face of the glass 67, unless the disk 66 be loosened from the glass 67 and re-affixed in another location.

Figure 16:
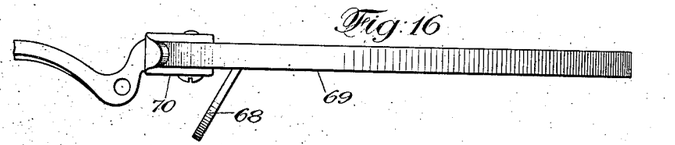
Fig. 16 is a top view of the simplest modification of the invention.

The very simplest modified embodiment of the invention illustrated in Fig. 16 remains to be explained. In this construction a reflector 68, which may be a silvered mirror such as shown in face view of Fig. 18, is beveled at one edge, as shown in Fig. 16, and is secured at such beveled edge by adhesive directly to the eyeglass 69 adjacent to its inner edge and in close proximity to the frame 70, which is shown as secured to the glass 69 at its inner edge in the usual manner. The reflector 68 is shown as arranged at the proper angle for viewing objects directly at the side of the observer. By reason of its location near to the inner edge of the glass 69 and in close proximity to the frame 70, the reflector 68 is quite inconspicuous and not readily observable. Also by reason of its location, the reflector 68 presents to the eye a larger field of vision and permits a more natural position of the eye than would a reflector fixed at the outer margin or outer edge of the eyeglass. By reason of the inconspicuous location and nature of the reflector 68, the glass 69 does not need to be dark to assist in concealing the reflector 68, but may be clear glass as indicated in the drawings by the lighter color. Although this is a very simple construction, it is also a very practical construction. There is absent only the feature of adjustability, which enables the presenting to the eye of objects at a plurality of positions corresponding to a single position of the head of the observer and which also permits the reflector at certain times to be brought directly into the line of vision when the eye is looking straight ahead. The location of the reflector in proximity to the frame at the inner edge of the eyeglass is, taken altogether, by far the most desirable position. In several of the different constructions illustrated, the reflector is adjustable away from this its normal position, but in other of the modifications, in which dark glasses are employed, the reflector is shown as permanently or fixedly located away from the inner edge of the glass and more nearly straight ahead in the direct line of vision, but always at an appreciable distance inward from the outer edge of the glass, as is also true of all of the constructions when the reflector is in normal position, as hereinbefore more particularly explained. It is to be noted that the reflector 68 could be affixed at a different point on the glass 69, and particularly this form of reflector could be advantageously employed more nearly to the center of a dark glass.

In all of the constructions the reflectors may be duplicated at opposite sides, one being provided for each eye. When the reflector 68 is thus duplicated near to the inner edges of the glasses, because of the fact that the reflectors are located inward from the direct line of vision, the use of one of the reflectors will not in any manner be marred by the presence of the other reflector.

It is obvious that various other modifications may be made in the constructions shown in the drawings and above particularly described within the principle and scope of my invention.

I claim:

1. In combination with an eyeglass, a reflector of less dimensions than the eyeglass back of and entirely within the outer boundaries of the eyeglass so as to be concealed thereby and normally located at an appreciable distance inward from the outer edge of the eyeglass so as to present to the eye a large field of vision and to permit a natural position of the eye as well as for further concealment of the reflector and supported at an angle to the eyeglass suitable for viewing in the reflector objects out of the direct line of vision.

2. In combination with an eyeglass, a reflector supported at the rear thereof adjacent to the inner margin thereof for substantially concealing the reflector from the public and arranged at an inclination to the eyeglass providing for viewing objects out of the direct line of vision while presenting to the eye a large field of vision.

3. In combination with an eyeglass provided at its inner margin with a frame, a reflector supported at the rear of the eyeglass in proximity to the frame at the inner margin of the eyeglass and disposed at an inclination to the eyeglass so that objects out of the direct line of vision may be seen in the reflector and for affording concealment to the reflector by reason of its proximity to the frame and location at the rear of the eyeglass, the positioning of the reflector in proximity to the inner margin of the eyeglass providing an angle of the reflector which will present to the eye a field of vision of maximum extent.

4. In combination with an eyeglass, a reflector at the rear of the eyeglass, and a support for the reflector including means permitting adjustment of the reflector bodily across the surface of the eyeglass to different positions within the outer boundaries of the eyeglass.

5. In combination with an eyeglass, a reflector at the rear of the eyeglass, and a support for the reflector including means permitting adjustment of the reflector bodily to substantially all points within the marginal boundaries of the eyeglass.

6. In combination with an eyeglass, a reflector at the rear of the eyeglass adjacent to the inner edge thereof, and a support for the reflector including means permitting adjustment of the reflector away from and toward such inner edge.

7. In combination with an eyeglass provided at its inner margin with a frame, a reflector carried by the frame at the rear of the eyeglass, and a support for the reflector including means permitting adjustment of the reflector relatively to the support.

8. The combination with an eyeglass, of a reflector at the rear side thereof, and an extensible support for the reflector.

9. The combination with an eyeglass provided with a frame, of a reflector at the rear side of the eyeglass, and an extensible support for the reflector mounted on the frame.

10. The combination with an eyeglass, of a reflector adjustably mounted thereon, and means for automatically adjusting the angle of the reflector concurrently with its bodily adjustment.

11. The combination with a frame carried by the head of the user and an optical reflector for presenting objects to the eye, of means for supporting the reflector on the frame including an arm pivoted at two points, the axes of the pivots being disposed at an angle to one another substantially in the same plane.

12. The combination with an eyeglass, of a reflector at the rear side of the eyeglass, and a support for the reflector, such support including an arm pivoted at each end, the axes of the two pivots being inclined to one another substantially in the same plane and the axis of one of the pivots being substantially perpendicular to the glass.

13. The combination with an eyeglass and a reflector, of a series of jointed arms solely supporting the reflector on the eyeglass and providing for rectilinear bodily movement of the reflector.

14. The combination of an eyeglass provided with a frame, a reflector at the rear of the glass, and a series of jointed arms connecting the reflector to the frame.

15. The combination with an eyeglass and a reflector, of a series of pivoted arms supporting the reflector on the glass, in one of the positions of adjustment the axes of alternate pivots being substantially parallel one to another in a plane substantially perpendicular to the glass.

16. The combination with an eyeglass and a reflector at the rear side thereof, of a support for the reflector including means for permitting the adjustment of the reflector both bodily across the glass and angularly with respect to the glass.

17. The combination with an eyeglass, of a reflector at the rear side thereof, and a support for the reflector including means for permitting the adjustment of the reflector bodily across the glass, angularly with respect to the glass, and rotatively on a pivot whose axis is substantially perpendicular to the glass.

18. The combination with an eyeglass provided with a frame having a securing screw passing through the glass, of a reflector at the rear side of the glass, and a support for the reflector including a part supported by the screw.

19. The combination with an eyeglass provided with a frame having a securing screw passing through the glass, the screw being provided with a hole longitudinally thereof, of a reflector at the rear side of the glass, and a support for the reflector, such support including a part entering the hole in the screw.

20. The combination with an eyeglass provided with a frame having a securing screw passing through the glass, the screw being provided with a hole longitudinally thereof, of a reflector at the rear side of the glass, and a support for the reflector, such support including a part engaged by the screw and also including a second part detachably entering the hole in the screw and detachably engaged by the first part, whereby the reflector and its support, excepting the part thereof engaged by the screw, are quickly detachable.

21. The combination with a pair of eyeglasses, of a reflector at the rear of each glass, and a support for at least one of the reflectors including means rendering such reflector movable to a position inward from the center of the glass.

22. The combination with a pair of eyeglasses, of reflectors at the rear of each glass, and supports for the reflectors including means permitting movement of the reflectors to positions inward from the centers of the glasses.

23. The combination with a frame carried by the head of the user and an optical reflector for presenting objects to the eye, of a support for the reflector secured to the frame solely inwardly from the eye.

24. In combination with an eyeglass provided with a frame, of a reflector at the rear of the eyeglass, and a support for the reflector mounted on the frame at the inner margin of the eyeglass.

25. In combination with an eyeglass, of a reflector supported at the rear thereof at an angle suitable for presenting objects to the eye out of the direct line of vision and located at least in part within the inner half of the eyeglass so as thereby to provide a large field of vision together with substantial concealment of the reflector from the public.

In testimony whereof I have affixed my signature in presence of two witnesses.

FRANK M. WALTS.

Witnesses:
HERBERT H. GIBBS,
WM. ASHLEY KELLY.